Patented Aug. 17, 1926.

1,596,785

UNITED STATES PATENT OFFICE.

HERMANN WEYLAND, OF ELBERFELD, GERMANY, ASSIGNOR TO WINTHROP CHEMICAL COMPANY, INC., OF NEW YORK, N. Y.

MANUFACTURE OF ALBUMIN DERIVATIVES SOLUBLE IN WATER.

No Drawing. Application filed November 17, 1925, Serial No. 69,712, and in Germany January 10, 1925.

The present invention concerns the manufacture of products soluble in water by the treatment with alkylene oxides of plant or animal albumin or substances containing such materials, as for example casein, meat, bacteria cells or their products of metabolism, the alkylene oxide being closely linked up or chemically combined. According to the conditions of interaction the albumin in question is more or less split up. The new products are intended to find application for the manufacture of new preparations possessing technically or therapeutically valuable properties.

The following examples will serve to illustrate my invention and to indicate the wide applicability of the same, without in any way restricting myself to proportions or working conditions.

The new products are generally syrup like hygroscopic compounds of gum like character—soluble in water from which solution they are precipitated by tannin or picric acid.

*Example 1.*—20 parts by weight of dry meat meal and 50 parts by weight of ethylene oxide are heated under pressure for 5 hours on a water bath. A brown alkaline liquid results, which is soluble in water and alcohol and also in mineral acids, but is readily precipitated by tannin mercuric chloride solution or phosphotungstic acid solution, whilst picric acid no longer exerts a precipitating action. If the liquid is distilled under greatly reduced pressure an alkaline distillate possessing a basic odour is obtained, which is precipitated by tannin and mecuric chloride solution.

*Example 2.*—20 parts by weight of casein and 50 parts by weight of propylene oxide are heated for 24 hours on a water bath in a closed vessel. A solution is thus obtained, similar to the one described in example 1. It is worked up in an analogous manner.

*Example 3.*—10 parts by weight of dry fibrin are shaken with 10 parts by weight of ethylene oxide for a prolonged time at ordinary temperature. The previously insoluble albumin is thereupon rendered soluble in water giving an alkaline reaction. On the addition of acid to the aqueous solution a slight opalescence is produced, whilst alcohol causes a flocculent precipitate; ready precipitation also takes place with the customary reagents for albumin and with neutral salts.

*Example 4.*—40 parts by weight of edestin from hemp seed are treated for 8 days in a closed vessel at ordinary temperature with 10 parts by weight of ethylene oxide. The product is taken up in 700 parts by weight of physiological common salt solution, the resulting solution is centrifuged, nearly completely neutralized and a solution containing 10 per cent. of dissolved edestin is then prepared by suitable dilution if necessary.

*Example 5.*—Cultures of tubercular bacilli are dried over concentrated sulphuric acid, exhaustively extracted with ether and again dried over concentrated sulphuric acid.

10 parts by weight of the bacterial preparation thus obtained are treated for 8 days with 10 parts by weight of ethylene oxide in a closed tube in a thermostat which is kept at 37° C. The product is thereupon agitated for several hours with physiological common salt solution (a 0.8% solution of common salt) and finally centrifuged. Albumin solutions obtained in this manner find suitable application for the preparation of diagnostically and therapeutically efficient anti-compounds and immune bodies.

I claim:

1. Process for the manufacture of albumin derivatives soluble in water, consisting in the treatment of albumin with an alkylene oxide.

2. The new albumin derivatives which are the reaction products of albumin and alkylene oxides and generally syrup like hygroscopic compounds of gum like character soluble in water from which solution they are precipitated by tannin or picric acid and show the biuret reaction.

In testimony whereof I have hereunto set my hand.

HERMANN WEYLAND.